United States Patent [19]

Habib

[11] Patent Number: 4,588,477
[45] Date of Patent: May 13, 1986

[54] TRAVELING FLUIDIZED BED DISTILLATION OF SCRAP TIRES AND RUBBER VULCANIZATE

[76] Inventor: Ikram W. Habib, 6982 Parma Park Blvd., Parma Heights, Ohio 44130

[21] Appl. No.: 609,292

[22] Filed: May 11, 1984

[51] Int. Cl.$^4$ .................... C10B 49/10; C10B 57/02; C10B 57/04
[52] U.S. Cl. .................... 201/25; 75/87; 201/31; 201/44; 585/241
[58] Field of Search .................... 48/209; 201/2.5, 25, 201/31, 44; 585/241; 75/87

[56] References Cited

U.S. PATENT DOCUMENTS

| | | | |
|---|---|---|---|
| 2,194,575 | 3/1940 | Snyder | 48/700 |
| 2,595,366 | 5/1952 | Odell et al. | 201/31 |
| 2,719,112 | 9/1955 | Kearby et al. | 201/31 |
| 3,582,279 | 6/1971 | Beckman et al. | 23/209.2 |
| 3,823,223 | 7/1974 | Liska et al. | 423/445 |
| 3,852,216 | 12/1974 | Ninomiya et al. | 201/31 |
| 3,890,141 | 6/1975 | Crane et al. | 75/86 |
| 3,929,585 | 12/1975 | Grommett | 201/31 |
| 4,017,272 | 4/1977 | Anuer et al. | 201/31 |
| 4,029,550 | 6/1977 | Mitsui et al. | 201/31 |
| 4,030,984 | 6/1977 | Chambers | 201/25 |
| 4,203,804 | 5/1980 | Janning et al. | 201/31 |

FOREIGN PATENT DOCUMENTS 0057180 5/1978 Japan .................... 201/25

OTHER PUBLICATIONS

Bureau of Mines, "Destructive Distillation of Scrap Tires", by D. E. Wolfson et al.; Year 1976, pp. 1-19.

Primary Examiner—Peter Kratz
Attorney, Agent, or Firm—R. A. Sturges

[57] ABSTRACT

Method for traveling fluidized bed distillation of coarse ground tire scrap, rubber vulcanizate (also vulcanized rubber), in a mixture with coarse aggregate. The rubber and aggregates are charges to a vertical still equipped with power burners near the bottom to burn a portion of the carbonaceous residue and supply the needed heat for the distillation process. The volatile materials and the pyrolysis oil vapors are drawn at the top for recovery and processing. Fines are recovered and the aggregate still at elevated temperatures are recycled to the top of the column and reused again with additional ground rubber. Noncondensable gases resulting from the "pyrolysis oil" condensation and recovery system contain high heating value and can be used for combustion needs in the still, or for steam generation. Therefore, this invention makes use of the different components of the distillation process by selecting the gases and the carbonaceous components for combustion and heating needs to generate the pyrolysis oils in high yield. Another use of this invention is the production of zinc, as a result of the reducing atmosphere and high temperature present below the combustion zone.

4 Claims, 3 Drawing Figures

TRAVELING FLUIDIZED BED DISTILLATION OF SCRAP TIRES AND RUBBER VULCANIZATE

BACKGROUND OF THE INVENTION

1. Field of the Invention

This invention relates to methods and apparatus for production of pyrolysis oils, gaseous matter, charred carbon, zinc, and filler materials from synthetic or natural rubber and rubber vulcanizates, particularly, used old tires (referred to hereinafter as scrap rubber) by traveling fluidized bed distillation. Waste rubber disposal is a critical problem due to the huge amounts generated every year, and the lack of acceptable and economical means to recycle or convert the waste rubber into valuable products. Only a small portion of the waste tires are retreaded, and a very small portion is devulcanized by tedious processes, usually in batches. Some of the scrap tires are buried in landfills or completely burned. Neither method has gained popular acceptance because the waste tires make poor landfill, and they do not readily degrade. Combustion of waste tires is difficult to accomplish without creating environmental pollution problems.

2. Description of Prior Art

A number of processes are known for the production of pyrolysis oils and other products by the thermal decomposition of rubber vulcanizates. These processes differ from each other in the manner of heat supply, heat transfer, use of devulcanizing agents, introduction of oxygen for oxidative distillation, size requirements of feed materials, and methods of feeding and removal of residue. One of the disadvantages in the known processes is the formation of coke, which hinders production. Numerous interruptions are necessary in the process in order to free the apparatus from the coke. These methods are not geared for high production and tend to be less practical as the disposal of waste tires and similar rubber products increases every day. The present invention provides for economical and acceptable environmental means for disposal of waste tires and rubber products, and it also provides for recovery of valuable products.

U.S. Pat. No. 4,030,984 discloses the method and apparatus by which the whole tires are suspended in hot gases, melting the carbonaceous material and converting it into raw material.

U.S. Pat. No. 3,890,141 discloses a method to heat treat scrap tires to produce a fluid material which, in turn, is burned to produce heat energy. The ash in the flue gases is collected by high efficiency air cleaning devices for recovery, and the ash is further processed to recover the zinc and titanium.

U.S. Pat. No. 3,823,223 disclosed the method to produce char from the destructive distillation of scrap synthetic rubber for use in rubber enforcement.

U.S. Pat. No. 3,582,279 discloses a method and apparatus for oxidative distillation of rubber vulcanizate by partial combustion of waste rubber, using air throughout the still or retort.

Bureau of Mines Report of Investigation 7302, "Destructive Distillation of Scrap Rubbers," September, 1969, discloses the gaseous, oil, and carbonaceous materials produced from different waste rubber compositions, and at different distillation temperatures. The study identifies the different compounds produced and their percentages.

SUMMARY OF THE INVENTION

This invention relates to methods and apparatus for production of pyrolysis oils, gaseous matter, charred carbon residue of carbon black, zinc, and other filler materials from waste rubber, by the use of traveling fluidized bed technique and selective combustion. The waste rubber is mixed with aggregate materials (recycled within the system at elevated temperatures), in a distillation column and allowed to move downward into several zones, where thermal and chemical treatment takes place. These zones are: (a) Preheating zone, (b) Distillation zone, (c) Precombustion zone, (d) Combustion zone, (e) Post-Combustion zone, (f) Reduction zone, and (g) Cooling zone. The aggregate materials trap the rubber pieces and prevent the rubber from sticking together and forming one large mass. Further, its weight moves the scrap rubber downward, the space between the different pieces allows the volatile materials to escape, and the rubber pieces remain in dynamic motion until all of the volatile matters are removed. The aggregate materials retain part of the heat energy produced in the column. It also allows the distribution of the heated gases throughout the column and allows the creation of a fluidized bed by the dynamic movement of the smaller parts of aggregate, pieces of rubber and the charred carbon residue.

The volatile matter is drawn at the top and cleaned from suspended particles in high efficiency cyclones. The cleaned volatile matter is subjected to cooling and scrubbing operations to remove gaseous sulfur compounds and condense heavy and light fractions of pyrolysis oils. These oils can be fractionally distilled into oils with variable boiling points. The remaining noncondensables are used for combustion needs and steam generation.

BRIEF DESCRIPTION OF DRAWINGS

The accompanying drawings illustrate apparatus suitable for carrying out the process according to this invention.

DESCRIPTION OF PREFERRED EMBODIMENTS

The pyrolysis-distillation of waste rubber products produces an oily distillate, dark in color, called "pyrolysis oil." This oil contains acids, bases, neutral oils of olefins, aromatics, paraffin, and naphthenes, compounds that are present in the elastomer. The composition of the oil will vary with the pyrolysis-distillation temperature, particle size, and with the residence time at the pyrolysis temperature, which is between 500° C. and 1100° C. The higher the pyrolysis temperatures, the tendency is for the aromatic compounds to increase. Higher aromatic content of pyrolysis oils is desirable for preparation of resins suitable for molding. The noncondensable gases contain small amounts of butadiene and isoprene monomers, products of combustion: nitrogen, carbon dioxide, water vapor, and sulfur dioxide, in addition to combustible gases of hydrogen, methane, ethane, propane, hydrogen sulfide, and other organic vapors. Monomers can be recovered by refrigeration. The remaining gases, with a heating value of 500 BTU to 900 BTU per cubic foot, are used for combustion and steam generation.

This invention relates to a continuous traveling fluidized bed pyrolysis-distillation system for production of pyrolysis oils of variable aromatic contents from scrap rubber vulcanizate, shredded into pieces of small size (up to one inch), and in mixture with aggregate maerials. Waste rubber vulcanizate is prepared by cracking old tires to the required size, and the removal of free tire bead and steel cords. The larger size used in this invention is of advantage because it requires less energy to prepare when compared with other recovery systems that require a ground rubber of less than six millimeters in size. It is the primary object of this invention to provide a process, method, and apparatus that enhance the yield and the composition of the pyrolysis oil produced by pyrolysis-distillation of scrap rubber vulcanizate. Because this invention can be used on a large scale, it provides an economical and acceptable environmental solution to the disposal problems of waste tires.

This invention proposes to utilize fluidized bed mixture of waste rubber vulcanizate and aggregate materials made up of refractory materials and/or steel slag (referred to hereinafter as aggregate). The scrap rubber is made up of ground waste tires, vulcanized, and unvulcanized rubber, in sizes up to one inch, as determined by the size of the distillation column. The aggregate materials are a coarse mixture of high temperature refractory and steel slag in sizes ranging between ⅜ inch to one inch. The aggregate materials are constantly recycled in the distillation column and are introduced at the top with the scrap rubber.

Figure 1:
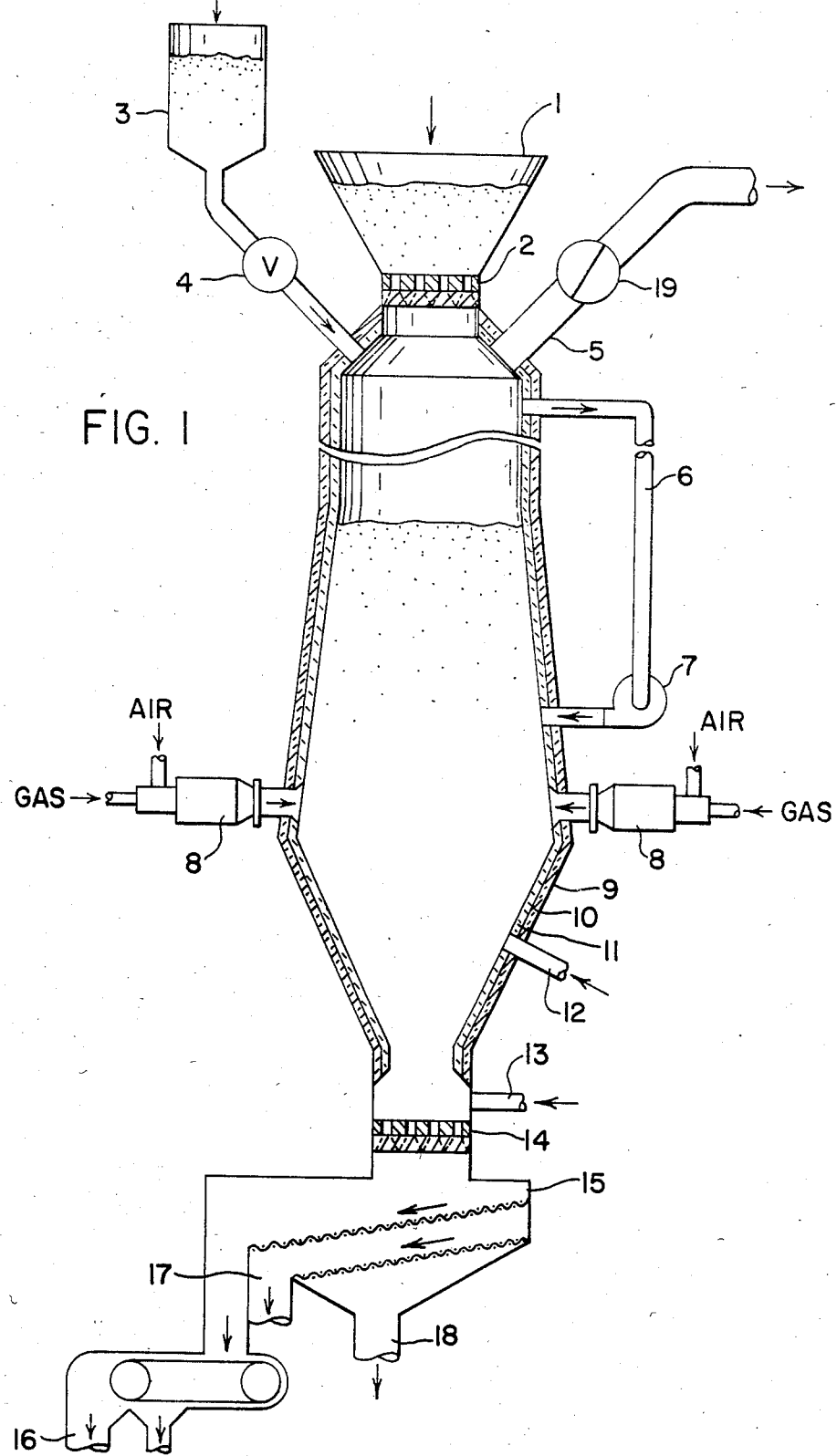
FIG. 1 is a schematic representation in elevational view of fragmentary portions of the distillation column into which the rubber and aggregates are charged and processed to yield volatile materials and char, carbon-rich in elemental zinc.

Referring to FIG. 1, the pyrolysis-distillation apparatus is a refractory-lined steel column with insulation 10 between the steel shell 9 and the refractory 11. High temperature dense refractory is needed for the lower half of the column, while light refractory might be used for the upper half. The column is equipped with feeding hoppers for aggregates 1 and scrap rubber 3. Each hopper is equipped with air lock feeding valves 2 and 4, that permit slightly above atmospheric operation in the column. The scrap rubber mixed with aggregate materials are allowed to move downward into several zones, where thermal and chemical tratment takes place. These zones are:

(a) Preheating zone (200° C. to 400° C.), where the scrap rubber is heated by the sensible heats of the aggregate materials and the volatile matter leaving the column.

(b) Heating and the distillation zone (400° C. to 500° C.), where the scrap rubber reaches a temperature high enough to cause distillation and thermal decomposition to take place, the height of this zone is directly related to the particle size of the scrap rubber, and amount or heat applied in the combustion zone and post-composition zone, the pressure maintained inside the column, and the rate of removal of aggregates and volatile matter from the column.

(c) Precombustion zone (500° C. to 900° C.), where pyrolysis takes place because of the relatively high temperature of the gases leaving the combustion zone, and thus the residual rubber is reduced to a carbonaceous residue. The rate of pyrolysis of the residual rubber and production of high yield of aromatics in the pyrolysis oil is controlled by recirculating a side stream of the volatile matter before leaving the column 6, with the aid of recirculation blower 7. The recirculated stream suppresses any combustion in the precombustion zone and maintains suitable pyrolysis temperature.

(d) Combustion zone (800° C. to 1100° C.), where auxiliary gaseous fuel (mixture of natural gas and a portion of the waste gas from the recovery section) is introduced 8 and combusted with excess air under sufficient pressure to fluidize the carbonaceous residue and the small particles of waste rubber present above the combustion zone, and provide the heat energy requirement through combustion of a portion of the carbonaceous residue and combustion of any combustible gases produced below the combustion zone.

(e) Post-combustion zone (900° C. to 1100° C.), where controlled volume of secondary air is introduced to sustain sufficient combustion to provide the needed heat energy for the reduction zone 12.

(f) Reduction zone, where a reducing atmosphere is maintained to reduce the zinc oxide into elemental zinc, the reducing atmosphere is produced by allowing steam in the cooling zone to form blue water gas according to the following equations:

$$C + H_2O \rightarrow CO_2 + H_2 - \text{Heat}$$

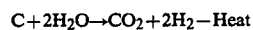

$$C + 2H_2O \rightarrow CO_2 + 2H_2 - \text{Heat}$$

$$C + H_2O \rightarrow CO_2 + H_2 - \text{Heat}$$

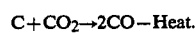

$$C + CO_2 \rightarrow 2CO - \text{Heat}.$$

Thus, the heat produced by the post-combustion zone and the reducing gases produced by the cooling zone provide the conditions needed for the reduction of zinc oxide into elemental zinc.

(g) Cooling zone (350° C. to 500° C.), where small volume of steam is introduced to cool the aggregate and the residue materials 13, sufficient enough to allow their handling outside the column.

The aggregate materials are discharged by an air lock discharge valve 14 to an enclosed conveying and screening mechanism 15. Remaining broken steel cords are magnetically removed within the screen, aggregates are returned to the column after separation of foreign objects such as fused glass and broken pieces 16, and used over 1. The fine residue is separated by oscillating screen into two products—one is a carbonaceous mix, suitable for use as filler material or carbon black 18, and the second product is a coarse mix, high in elemental zinc 17. Zinc can be reclaimed by smelting.

The volatile matter leaves the column from the top 5. Pressure within the column is controlled by a butterfly valve 19.

The use of aggregate and their constant movement in the column, their removal, and their reuse helps to create the following conditions:

1. It creates a fluidized bed of the scrap rubber pieces within the column. Further, it provides for easy passage of the hot gases at low pressure drop, which is needed to conduct a counter current flow, and allows the transfer of heat from the hot gases to the rubber-aggregate mixture.

2. It prevent the rubber pieces from forming a fused mass and causing poor heat and mass transfer in the column.
3. Its weight helps forcing the rubber downward toward the high temperature zone.
4. It retains the heat (sensible heat) and provides the heat transfer medium needed to distribute the heat to the waste rubber in the distillation section.
5. It creates a large surface area for heat transfer throughout the column and the combustion zone.
6. The percentage of rubber to aggregate ratio can be changed to affect the composition of pyrolysis oil and its yield.
7. It prevents the carry-over of carbonaceous materials and other fines with the vapors and gases leaving the column.

Thus, unlike prior art systems, which rely upon indirect heat transfer, or direct pyrolysis in a batch-type retort, this invention provides for direct pyrolysis-distillation of the waste rubber using heated aggregate and hot gases from the combustion zone. Further, the energy needed for this system is provided by combustion of natural gas, portion of the waste gases generated, and by the combustion of carbonaceous materials present with the fillers used for compounding rubber. Another advantage of this invention is its continuous operation, its high capacity, and controlled composition of pyrolysis oil and residue material.

The traveling fluidized bed column shown in FIG. 1 can be designed in any way to allow for large- or small-sized materials charged, the ratio of rubber to aggregate, the heat input to the column in the combustion zone, the amount of carbon allowed to burn in the post-combustion zone, the methods of removing the solid residue, the aggregate reuse system and the zinc-rich residue.

Figure 2:
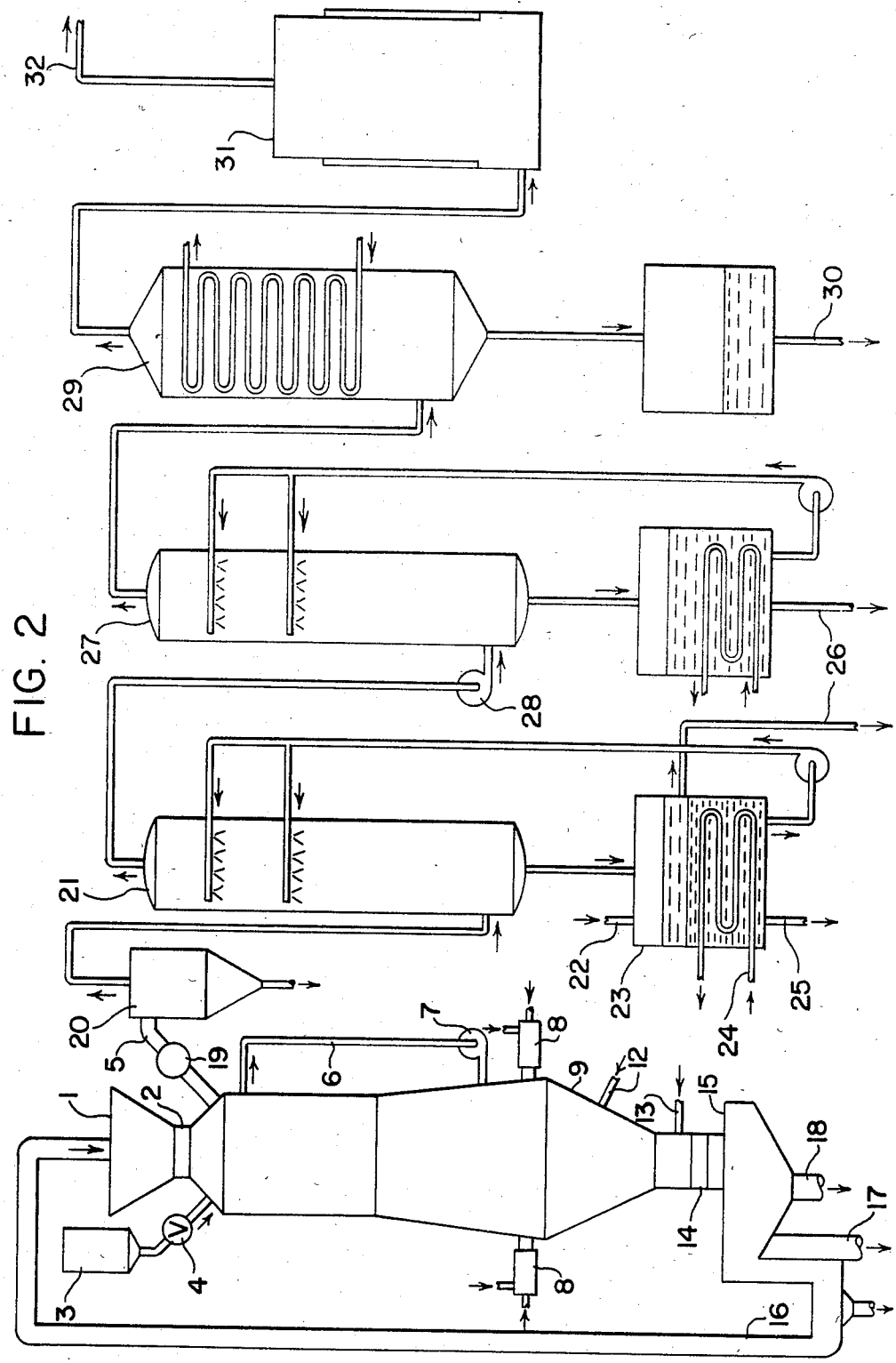
FIG. 2 is a schematic flow diagram for putting into practice the methods of reclaiming volatile materials produced according to this invention.

There are many arrangements for recovery of pyrolysis oils produced by this invention, and the flow sheet of FIG. 2 is suggestive of the basic steps needed to collect and recover the products. Additional fractional distillation of oils produced by this invention can be performed to separate the low boiling oils from the high boiling point oils, and the residue can be blended with fuel oils or sold as is for combustion purposes, or as feed stock for cracking operation for manufacturing of petroleum products.

Referring to FIG. 2, the recovery system consists of gas cleaning step to remove suspended particles from volatile matters in a high efficiency cyclone 20, followed by direct cooling and alkaline scrubbing in column 21 for the removal of sulfur dioxide and hydrogen sulfide gases. The effluent from the column is collected in a recirculation tank 23. Heavy oils are separated 26, alkaline make up solution 22 is added to adjust the pH of the solution. The tank is equipped with cooling coils to remove the sensible heat of the effluent stream from the column 24. Also provided is a blowdown 25 to the water treatment. The second column 27 provides for additional cooling and further condensation of heavy oils 26 by scrubbing with the heavy oils collected after removal of their sensible heat. The movement of vapors and gases through the recovery system is accomplished by electric-driven turboblower 28 placed after the first recovery column. The gas-vapor stream leaving the second column is subjected to indirect cooling 29 for recovery of light oil fraction 30. A gas holder 31 is provided to act as a temporary surge and storage of the remaining gases (called hereinafter waste gases). Waste gases 32 are used for combustion needs and steam generation.

The invention is further described in the following example:

EXAMPLE

Figure 3:
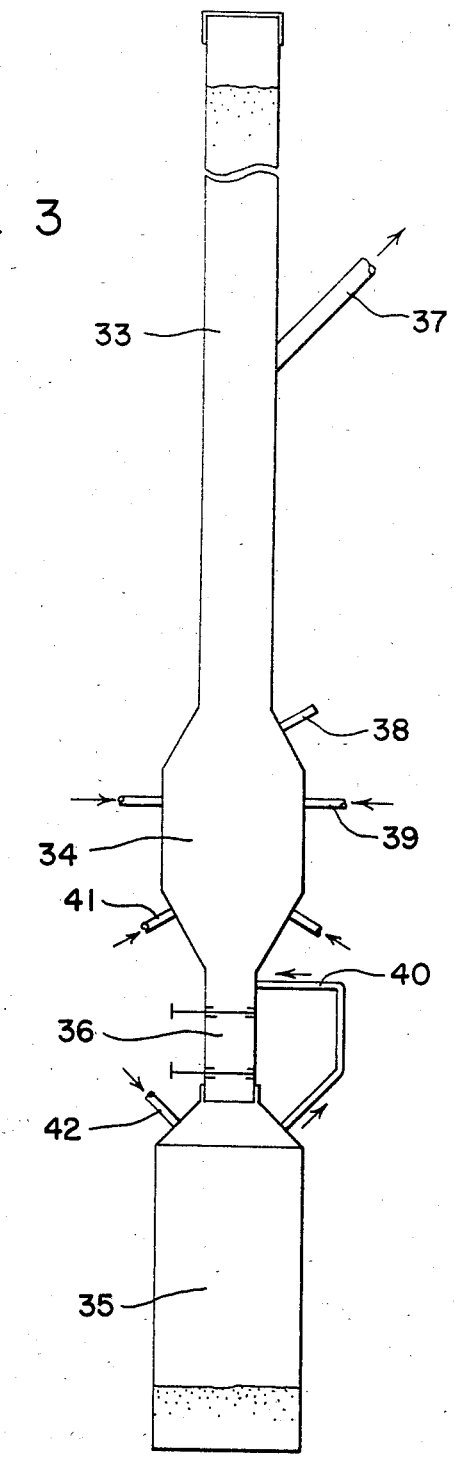
FIG. 3 is a schematic representation of the experimental column.

Experimental apparatus similar to the distillation column of FIG. 1 was used to simulate a traveling fluidized bed of aggregate materials and waste rubber mixture. The apparatus in FIG. 3 was made from three steel sections, joined together to form a column. The upper section is a pipe six feet long and five inches in diameter with a threaded top 33, a middle section which is a cylindrical container eight inches in diameter with a conical top and bottom, each with a 60° slope. The bottom cone has an opening of four inches, the height of the middle section is twenty-four inches 34. The bottom section is a cylindrical container eight inches in diameter and thirty inches high used to collect the aggregate and residue mix 35. The discharge from the middle section is controlled by two gate valves to regulate the rate of discharge of aggregate residue mix 36. The column is fitted with volatile matter take off opening 37, ports for temperature measurement 38, as well as opening for combustion burners 39, ports to allow the addition of steam 40, ports for secondary air 41, and cooling water 42.

A mix of shredded scrap automobile tires and crushed refractory bricks in size range $\frac{1}{4}$ inch to $\frac{3}{8}$ inch was prepared in different proportions. Each mix was subjected to conditions similar to the conditions described in this invention as follows:

Mix No. 1 was made of eighty pounds of aggregate and twenty-five pounds of scrap tires. Forty pounds of aggregates were charged to the column first in order to reach operating temperature before any aggregate-rubber mix was added. The mix was allowed to reach operating temperature in the precombustion zone of 850° C. Then, the entire contents of the column were allowed to drop at the rate of (approximately) one pound per minute into the container. Small amounts of water were added to cool the charge, and the vapors were vented to the lower section of the column. Volatile matters were collected by condensation using dry ice and waste gases were flaired off. During the experimental secondary combustion, air was introduced only during the second half of the experiment, which caused the the precombustion zone to reach 900° C. After the aggregate and residue mix was completely removed in the collection container, it was allowed to cool, nine pounds of residue was found with the aggregates. The condensate was dark in color, it contained water which was separated, and 10.8 pounds of oil were recovered. No attempt was made to measure the amount of waste gas generated during this example, but it can be accounted for as the difference between the starting weight and the weight of oil and residue collected which is 5.2 pounds. The residue mix contained 6.7 grams of free zinc as fine particles.

Mix No. 2 was made of eighty pounds of fresh aggregates and forty pounds of scrap tires, forty pounds of aggregates were charged to the column first, in order to reach operating temperature before any aggregate rubber mix was added. This example followed similar steps as Mix No. 1. The yield of products was as follows:
Residue: 16.2 pounds
Oil: 15.8 pounds
Waste Gas: 8.0 pounds Zinc: 10.4 grams.

It is understood that this invention has just been described without limitation of the same and that various modifications can be made without exceeding its scope, in particular, the ratio of aggregates to scrap rubber, the amount of residue allowed to burn to supplement the heat requirements of this invention, the operating temperatures and pressures, the composition of scrap rubber, the composition of aggregates, and the yield and composition of products.

What is claimed:

1. A process for disposal of waste rubber consisting essentially of the steps of:
   (a) charging, into an elongated vertically disposed distillation pyrolysis column, waste rubber having a particle size less than 1" and inert aggregate material having a particle size in the range of from ¾" to 1.0",
   (b) passing said charge downwardly into a preheating zone at a temperature of from 200°–400° C. to form a preheated charge wherein said rubber scrap is heated by the sensible heats of the aggregate material, and wherein volatile matter leaves the column; at the top thereof;
   (c) moving said preheated charge downwardly into a heating and distillation zone in said column at a temperature of from 400° to 500° C. wherein said charge is heated by upwardly moving gases to a temperature sufficient to cause distillation of volatile materials and thermal decomposition of the scrap rubber
   (d) moving said charge downwardly from said heating and distillation zone into a precombustion zone at a temperature of from 500° to 900° C. to pyrolyze the residual rubber remaining after step (c) above to a carbonaceous residue and yield a carbonaceous residue
   (e) moving said charge downwardly from said precombustion zone into a combustion zone at a temperature of from 800° to 1,100° C. and introducing auxiliary gaseous fuel and air at a rate sufficient to fluidize the carbonaceous residue and any waste rubber particles present above said combustion zone and to provide sufficient heat energy through combustion of at least a portion of the carbonaceous residue and any combustible gases produced in the zone below
   (f) moving said charge downwardly from said combustion zone into a post-combustion zone at a temperature of 900°–1,100° C. and introducing air into said zone to sustain combustion of said carbonaceous residue to provide heat energy to said moving charge for the succeeding reduction zone;
   (g) moving said charge downwardly into a reduction zone having a reducing atmosphere sufficient to reduce any zinc oxide from said scrap rubber to zinc metal, said reducing atmosphere being generated by introducing steam from the succeeding cooling zone;
   (h) moving said charge downwardly into a cooling zone at 350° C. to 500° C. and introducing an aqueous cooling medium into said zone
   (i) discharging hot aggregate material from said column
   (j) segregating inert material from carbonaceous material; and
   (k) recycling the segregated hot inert material for blending with fresh scrap rubber.

2. A process as defined in claim 1 wherein zinc is recovered from the aggregate material discharged from said column.

3. A process as defined in claim 1 wherein the aqueous cooling medium is steam.

4. A process as defined in claim 1 wherein pyrolysis oil is recovered from the vapors leaving said column.

* * * * *